June 17, 1930.　　　J. RODGER　　　1,764,752
CLUTCH CHECK
Filed May 22, 1928　　2 Sheets-Sheet 2
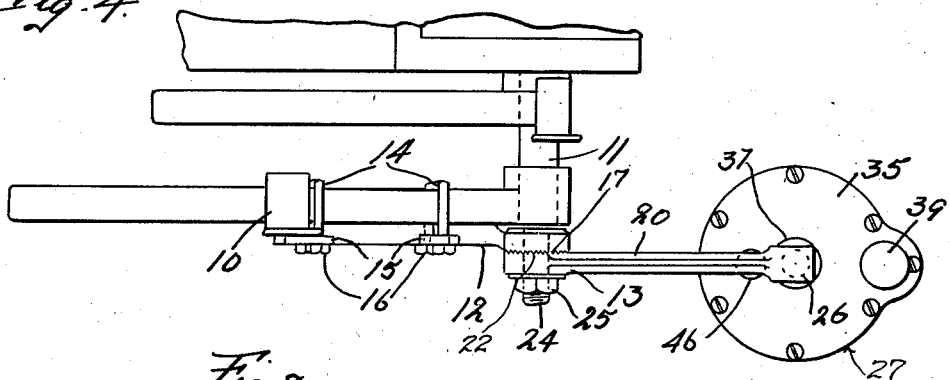
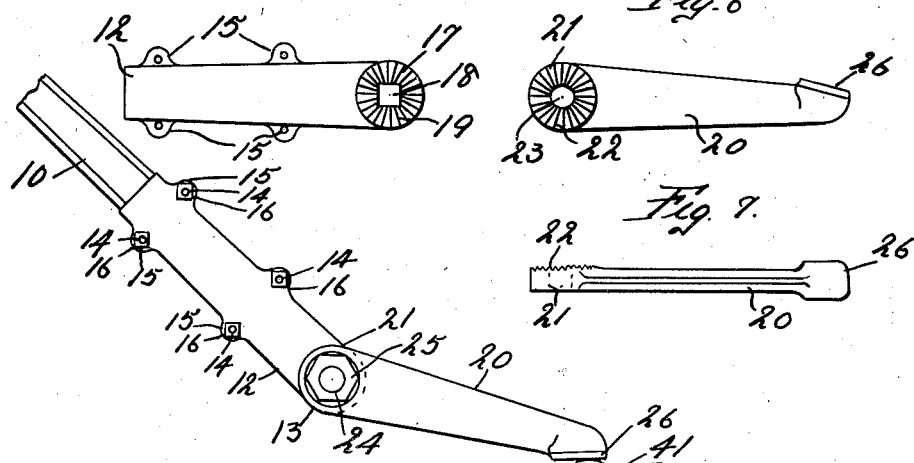
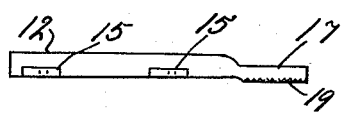
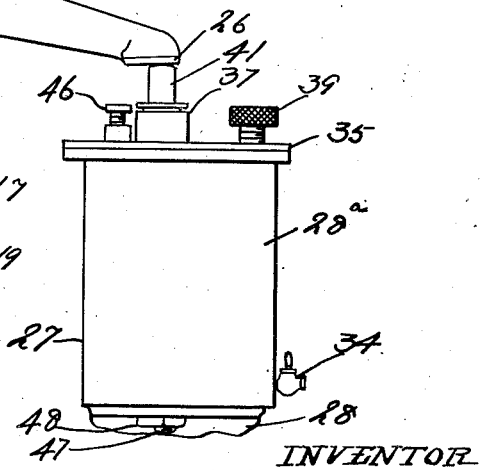
INVENTOR
John Rodger
By H. W. Williamson
Atty.

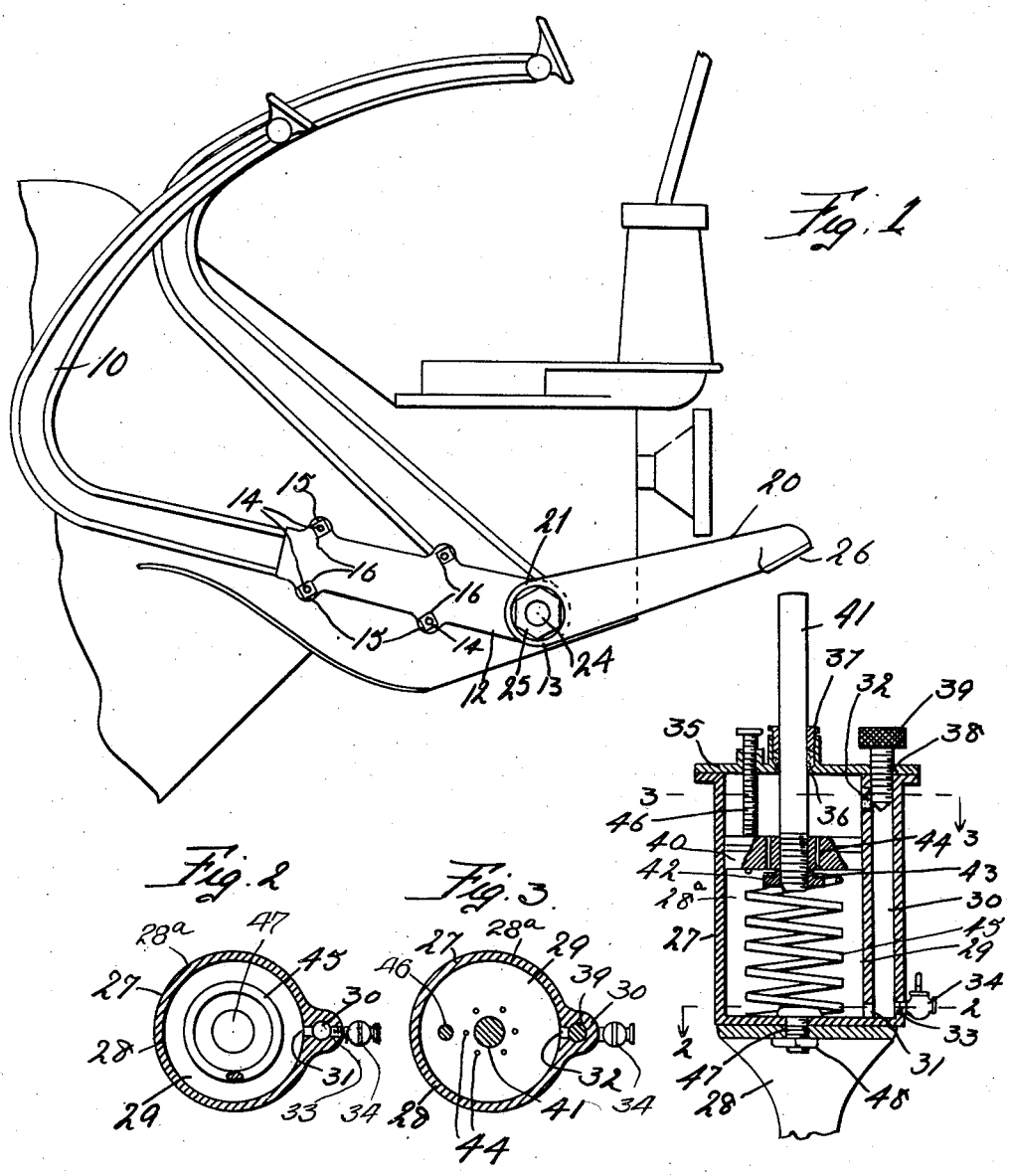

Patented June 17, 1930

1,764,752

UNITED STATES PATENT OFFICE

JOHN RODGER, OF EAST LANSDOWNE, PENNSYLVANIA

CLUTCH CHECK

Application filed May 22, 1928. Serial No. 279,679.

My invention relates to new and useful improvements in a clutch check and has for one of its objects to generally improve the construction of devices of this character so as to be of simple construction, small and compact although strong and durable and efficient in operation.

Another object of my invention is to provide two coacting elements, exemplified in a dash pot supported by a suitable part of the automobile and lever mounted upon the clutch pedal and capable of adjustment for regulating the point at which the action of the check will begin and also to provide for the connection of the lever with different forms of clutch pedals.

A further object of the invention is to provide readily accessible adjusting means for regulating the outward stroke of the dash pot piston.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which:

Fig. 1, is a side elevation of my improved clutch check showing portions of the dash pot in longitudinal vertical section and illustrating the manner in which it is applied to an automobile.

Fig. 2, is a section of the dash pot on the line 2—2 of Fig. 1 with the petcock in elevation.

Fig. 3, is also a section of the dash pot on the line 3—3 of Fig. 1.

Fig. 4, is a fragmentary plan view of Fig. 1.

Fig. 5, is a side elevation of the main parts of the device illustrated in Fig. 1, showing the clutch lever in the operative position.

Fig. 6, is a face view of the operating arm of the clutch lever.

Fig. 7, is an edge view thereof.

Fig. 8, is a face view of the clamp member of the clutch lever and Fig. 9, is an edge view thereof.

In carrying out my invention as herein embodied, 10 represents a clutch pedal mounted upon an end of the shaft 11 of the clutch operating fork (not shown) located as usual within the clutch housing of the automobile.

On the clutch pedal is removably mounted the clamp member 12 of the clutch lever 13 by means of U-bolts 14 or their equivalent surrounding the clutch pedal and passing through ears 15 formed on the clamp member with nuts 16 threaded on the ends of said U-bolts. The clamp member 12 is provided with a hub 17 having an aperture 18 therethrough of rectangular cross section and provided with serrations 19 on one face.

The reference numeral 20 denotes the operating arm of the clutch lever and is provided at one end with a hub 21 having serrations 22 on one face for coaction with the serrations on the hub of the clamp member and through this hub is a circular opening 23 for registration with the bolt 24 which has a rectangular portion mounted in the hole 18 and on the bolt is a nut 25 to hold the parts together in any predetermined adjustment. The other or outer free end of the operating arm is provided with an extended contact portion 26 for coaction with the piston rod of the dash pot to be presently described.

The dash pot designated as a whole by the numeral 27 is supported by a bracket 28 or any other suitable part of the automobile and includes a cylinder 28ª provided with a piston compartment 29 and a by-pass 30 communicating with said piston compartment at its lower end through an aperture 31 and also with the upper end of said compartment through an aperture 32 and said cylinder is also provided at the lower end of the by-pass with a threaded aperture 33 for the reception of a petcock 34 whereby liquid or fluid in the cylinder may be drained therefrom.

The upper open end of the cylinder is normally closed by a suitable cover 35 provided with a central opening 36 for the passage of the piston rod and about this opening is located a stuffing box 37 and said cover is also provided with an opening 38 for the reception of the valve screw 39 which projects into the by-pass 30 and coacts with the aperture 32 to regulate the flow of fluid between the piston compartment and said by-pass.

Within the piston compartment is slidably mounted a piston 40 provided with a piston rod 41 projecting through the hole 36 and the stuffing box. This piston rod is preferably threaded into the piston so that a portion projects beyond the lower face and on said projecting end is threaded a nut 42 having a reduced portion lying toward the piston face, thus providing a space between the nut and piston for the check valve 43 resembling a washer, said check valve controlling the flow of fluid through a plurality of passageways 44 through the piston.

The piston is normally forced in one direction or upward by a spring 45 located between the bottom of the cylinder and said piston and the distance of the upward movement of said piston may be regulated to some extent by the stop screw 46 threaded through the cover 35 and by adjusting said screw longitudinally, the stroke of the piston may be varied.

In actual practice, the dash pot may be provided with a threaded screw or post 47 at the bottom end and an associated nut 48 for securing the dash pot to the bracket 28 or any other part of the automobile.

The operation of the device is as follows:—

The cylinder is filled with a suitable fluid and with the clutch pedal in its normal position shown in Fig. 5, the piston 40 is in the lower portion of the piston compartment.

When the clutch pedal is released, one portion of the clutch will be forced into engagement with another portion thereof in the usual manner and during the movement of the movable clutch member into the operative position, the clutch pedal will be moved toward the position shown in Fig. 5 so that the arm 20 will engage the upper and outer end of the piston rod 41 and thereafter the piston 40 will be moved downward against the action of the spring 45 and the liquid contained in the lower part of the piston compartment causing the valve 43 to close the passageways 44 so that the fluid in the lower part of the piston compartment will have to pass through the aperture 31 into the by-pass 30 and then through the aperture 32 into the upper part of the piston compartment and since the valve screw 39 can be adjusted to regulate the flow of fluid through said aperture 32, the downward movement of the piston will be checked thus checking or cushioning the final movement of the movable clutch element so that it will gradually take a firm hold upon the companion member of the clutch.

One of the effects of this cushioning or checking of the movement of the clutch into its operative position is the relieving of the usual jumping or jarring of the automobile since the clutch will always move into engagement at the same speed.

From the foregoing, it will be obvious that the stroke of the piston may be readily regulated by means of the screw stop 46 so that the checking action may take place over any desired length of stroke and due to the adjustability between the arm 20 and the clamp member 12 or the clutch pedal to which it is fastened, the movement of the clutch pedal prior to being checked by the device may be varied and may be adjusted to accommodate the position of the mounting of the dash pot in different types of automobiles.

Of course I do not wish to be limited to the exact details of construction as herein shown, as these may be varied within the limits of the appended claims without departing from the spirit of my invention.

Having thus fully described my invention, what I claim as new and useful is:—

1. A clutch check comprising a cylinder having a piston compartment therein, a by-pass at one side of said compartment and communicating at opposite ends with adjacent ends of the piston compartment through apertures in a wall of the by-pass, a piston slidably mounted in the piston compartment between the two apertures forming communications with the by-pass, said piston having passageways therethrough, a check valve controlling said passageways, a spring tending to force the piston upward, a screw stop for regulating the stroke of the piston, means to regulate the flow of fluid through the by-pass into the upper portion of the piston compartment, a piston rod carried by the piston and projecting through the head of the cylinder, and means for connection with the clutch pedal of an automobile for co-operation with the piston rod for checking the movement of the clutch pedal and associated parts in the clutch engaging direction.

2. A clutch check comprising a cylinder practically unobstructed from end to end and having a by-pass of equal length, said by-pass communicating at its ends with the interior of the cylinder, an adjustable valve to control one of the communications, the other communication always being fully open, a piston fitted in the cylinder for movement between the by-pass communications and capable of traveling substantially the entire length of said cylinder, said piston having passageways therethrough, a back-pressure operated valve to control said passageways, a spring to move the piston toward the end of the cylinder where the valve controlled communication of the by-pass is located, a piston rod connected with the piston and extending through the end of the cylinder where said valve controlled communication of the by-pass is located, a screw stop threaded through the end of the cylinder where said valve controlled communication of the by-pass is located for regulating the length of the stroke of the piston and its piston rod, and means carried by a clutch pedal for coaction with the piston rod whereby said pedal is retarded during the latter part of its movement in one direction without affecting its movement in the opposite direction.

In testimony whereof, I have hereunto affixed my signature.

JOHN RODGER.